United States Patent
Diensthuber et al.

[11] Patent Number: 6,026,875
[45] Date of Patent: Feb. 22, 2000

[54] VEHICLE TIRE WITH A TREAD EXHIBITING SIPES SUBSTANTIALLY RUNNING IN THE AXIAL DIRECTION

[75] Inventors: Franz Diensthuber; Christian Haigerer; Reinhard Mundl, all of Hannover; Helmut Rodewald, Rötzum, all of Germany

[73] Assignee: Continental Aktiengesellschaft, Hannover, Germany

[21] Appl. No.: 08/987,161

[22] Filed: Dec. 8, 1997

[30] Foreign Application Priority Data

Dec. 6, 1996 [DE] Germany .................. 196 50 702

[51] Int. Cl.[7] .................. B29C 33/42; B60C 11/12; B60C 113/00; B60C 115/00
[52] U.S. Cl. .................. 152/209.2; 152/209.23; 152/209.28; 152/DIG. 3; 425/28.1; 425/35; 425/46
[58] Field of Search .................. 152/209 R, 209 D, 152/DIG. 3, 209.2, 209.3, 209.18, 209.23, 209.28; 425/28.1, 35, 46

[56] References Cited

U.S. PATENT DOCUMENTS

| 2,122,736 | 7/1938 | Bourdon ............... 152/209 |
| 5,301,727 | 4/1994 | Inove ............... 152/209 R |
| 5,350,001 | 9/1994 | Beckmann et al. ............... 152/209 R |

FOREIGN PATENT DOCUMENTS

| 564435 | 10/1993 | European Pat. Off. ........... 152/209 D |
| 696521 | 2/1996 | European Pat. Off. ........... 152/209 R |
| 791250 | 12/1935 | France . |
| 4427895 | 2/1996 | Germany . |
| 6-143941 | 5/1994 | Japan ............... 152/209 R |

OTHER PUBLICATIONS

Patent Abstracts of Japan, vol. 098, No. 014, published Dec. 31, 1998.

*Primary Examiner*—Steven D. Maki
*Attorney, Agent, or Firm*—Greenblum & Bernstein, P.L.C.

[57] ABSTRACT

Vehicle tire and a metal sheet mold plate for forming the vehicle tire having at least one axial end section includes a tread that includes sipes running substantially axially in at least one of the axial end sections when viewed from the top (i.e., perpendicular to the tread surface). The sipes are corrugated to form corrugated ridges and valleys that are substantially straight lines diagonally inclined in an oblique plane parallel to the substantially axially running sipes. The substantially axially running sipes may include a first set of sipes and a second set of sipes. The corrugated ridges and valleys of the first set of sipes are oriented, with regard to a radially outward direction, to extend axially inwardly toward (i.e., toward a axial center of the tire). Conversely, the corrugated ridges and valleys of the second set of sipes are oriented, with regard to the radially outward direction, to extend axially outwardly (i.e., away from the axial center of the tire). At least one joint track is also provided that includes the corrugated sipes of the first and second sets of sipes.

23 Claims, 5 Drawing Sheets

VEHICLE TIRE WITH A TREAD EXHIBITING SIPES SUBSTANTIALLY RUNNING IN THE AXIAL DIRECTION

CROSS-REFERENCE TO RELATED APPLICATION

The present application claims priority under 35 U.S.C. § 119 of German Patent Application No. 196 50 702.2 filed Dec. 6, 1996, the disclosure of which is expressly incorporated by reference herein in its entirety.

BACKGROUND OF THE INVENTION

1. Field of the Invention

The present invention relates to a vehicle tire including a tread having a plurality of axial end sections and sipes (or slots) running substantially in an axial direction in at least one of the axial end sections when viewed from the top (i.e., perpendicular to the tread surface). As used herein, the term "sipe" refers to a void in the tread which closes up when in the footprint of the tire. The sipes are corrugated with corrugated ridges (or crests or peaks) and valleys such that the corrugated ridges and valleys are substantially straight lines and diagonally inclined in an oblique plane substantially parallel to a longitudinal extent of the sipe.

2. Discussion of Background Information

Tires similar in general to the type described above are known. The substantially axially running sipe, which may also be referred to as a transversal sipe, extends or runs, as is known in the prior art, not exactly in the axial direction but, preferably, at an angle of approximately 10° to 60° to the axis. When the tire tread is equipped with transversal sipes, the tread preferably is designed to run substantially parallel to the transversal sipes.

The remaining rubber between the sipes is generally referred to as a bridge. A successive arrangement of profile blocks in a circumferential direction is generally referred to as a track of segments. A successive arrangement of sipes in the circumferential direction is generally, and analogously, referred to as a track of sipes.

In principle, sipes reduce stiffness, particularly with respect to forces perpendicular to these sipes. Transversal sipes particularly reduce stiffness in the longitudinal direction.

The softening of the tread results in a tire surface that conforms more accurately to the surface roughness of the road in the contact area In this manner, a higher degree of friction with the surface is achieved.

The traction-enhancing effect is documented, e.g., particularly on snowy roads, based on the fact that a bridge bending effect, which already occurs with low longitudinal forces, causes the terminal ends of the bridges to extend into the contact area in their oblique position, thus, making contact with their edges and not in a planar manner. This formation of edges has particularly improved the traction on packed snow and on ice.

However, it has been found that the oblique positioning of the bridge ends has a negative effect on the braking path on wet roads. This disadvantage is particularly unfortunate for modem winter tires, because it is important to achieve not only good traction on snow but good braking performance on wet roads. This is further important because rainy road conditions occur more frequently than snowy conditions. Even on dry roads, a high degree of surface friction is expected of summer tires. For example, on a dry road, the oblique positioning of the ends also leads to a reduction of traction, although it still remains very high. Based on the proven winter tires, the braking performance on wet and partially dried roads was improved by reducing the number of sipes, particularly, the number of transversal sipes. However, this results in a poorer performance on snow.

French Patent No. 791 250 (issued in 1935) discloses a vehicle tire having a running tread which, when viewed from the top, exhibits substantially axially running sipes in an axial end section. The sipes have a corrugation with corrugated ridges and valleys that are straight lines and extend diagonally in an oblique plane. The diagonal direction of the corrugated ridges and valleys, with respect to a radially outward direction of the tire, extend axially outward, i.e., away from a axial tire center.

German Patent Application P 44 27 895.0 (published in 1994) discloses a vehicle tire having a tread which, when viewed from the top, exhibits substantially axially running sipes in either one or both axial end sections. The running sipes have a corrugation with corrugated ridges and valleys that are straight lines and extend diagonally in an oblique plane parallel to the running sipe. The diagonal direction of the corrugated ridges and valleys, with respect to the radially outward direction, extends axially inward, i.e., toward the axial tire center.

The two mirror-inverted embodiments disclosed in the prior art show a tendency to only use sipes that are spaced fairly close to each other for small terminal end rotations with only a small degree of resistance, and to minimize the additional enlargement of the terminal end rotations due to increasing tangential forces by interlocking the bridges with each other. However, the main effect of the prior art is that a very small end rotation is effective for improving the traction on snow and ice, but does not have a significant impact on the braking on a wet or dry road, and a larger terminal end rotation increases the traction on snow and ice only to an insignificant degree, but would decrease the braking performance on wet and dry surfaces significantly. In the German document this effect is even better utilized than in the French document.

SUMMARY OF THE INVENTION

The present invention improves traction on wet and dry road surfaces without causing a negative impact or effect, and improves traction on roads covered with snow and ice. However, the present invention does not provide tires that become louder, rather, they preferably emit or exhibit a more pleasant, and more desirable, lower amount of noise.

In accordance with the vehicle tire of the present invention, the above features of improved traction on dry, wet, and snowy roads are provided without sacrificing low noise advantages. Such a vehicle tire includes a tread having at least one axial end section and sipes running substantially axially in at least one of the axial end sections when viewed from the top (i.e., perpendicular to the tread surface). The sipes are corrugated to form corrugated ridges and valleys that are substantially straight lines diagonally inclined in an oblique plane parallel to the substantially axially running sipes. The substantially axially running sipes may include a first set of sipes and a second set of sipes. The corrugated ridges and valleys of the first set of sipes are oriented, with regard to a radially outward direction, to extend axially inwardly (i.e., toward an axial center of the tire). Conversely, the corrugated ridges and valleys of the second set of sipes are oriented, with regard to the radially outwardly direction, to extend axially outwardly (i.e., away from the axial center of the tire). The vehicle tire also includes at least one joint track that includes corrugated sipes of the first and second sets of sipes.

In accordance with the present invention, a positioning change of the corrugated ridges and valleys in successive sipes further increases the interlocking effect, blocking an additional bending of the diagonal corrugation. It seems surprising that a combination of the sipes in accordance with the above-noted prior art have been used to predict an average value in the achieved properties. However, the achieved traction of the tires in accordance with the present invention surprisingly surpassed the performance of the tires in accordance with both documents using comparable rubber mixtures.

According to the present invention, the terminal end bending is further reduced, thus, improving the wet and dry braking efficiency, while the number of sipes and the shape of the sipes, when viewed from the top or perpendicular to the tread surface, remains unchanged. Traction and braking efficiency, however, are not decreased on packed snow and ice because the slight terminal end bending that is required for creating the edges still occurs, as in the prior art, with the exertion of very small tangential forces.

The improvement achieved on wet and dry braking performance enables the tire of the present invention to use an increased number of sipes. In this way, the traction on packed snow and ice is improved as well.

The sipes in the tread of the vehicle tire are preferably arranged in a track. In such a track, each substantially axially running sipe having corrugated ridges and valleys oriented, in the radially outward direction, extending axially inward (i.e., toward the axial center of the tire) is immediately followed by a substantially axially running sipe having corrugated ridges and valleys oriented, in the radially outward direction, extending axially outward (i.e., away from the axial center of the tire). By switching or alternating the orientation of the corrugated ridges and valleys, the sound emitted from the sipe edges is slightly varied, which lowers the tonality of the noise radiating as a whole from the tire. Conversely, the sipes in the tread of the vehicle tire may be arranged in a track in which each substantially axially running sipe having corrugated ridges and valleys oriented, in the radially outward direction, to extend axially outward (i.e., away from the axial center of the tire) is immediately followed by a substantially axially running sipe having corrugated ridges and valleys oriented, in the radially outward direction, extending axially inward (i.e., toward the axial center of the tire). In this arrangement, by switching the orientation of the corrugated ridges and valleys, the sound radiated from the sipe edges is slightly varied, which lowers the tonality of the noise radiating as a whole from the tire.

It is also possible, according to the features of the present invention, to arrange the sipes in an alternating fashion, i.e., switching between one orientation of corrugated ridges and valleys and the other orientation of the corrugated ridges and valleys. It has been determined that the alternating arrangement of the orientation of the corrugated ridges and valleys provides the best possible traction. Further, the sound emission is at least not negatively effected by this arrangement.

To reduce tonality, it is more advantageous to execute the orientation change of the corrugated ridges and valleys in sequences that do not have short periods, but, rather, are arranged in sequences with longer periods, or are arranged in a completely non-uniform sequence. In accordance with the present invention, a conventional direct succession of sipes with a same orientation of corrugated ridges and valleys may be required in sectional arrangements.

The sipes are conventionally arranged such that the corrugated ridges and valleys in an oblique plane formed by a longitudinal extent of the sipe form an angle, with respect to the radial axis, of, e.g., approximately 20°–60°, and preferably, e.g., approximately 30°–50°.

The sipes may be formed with a conventional sipe width, e.g., approximately 0.3 mm–1.0 mm.

The sipes in the tracks of a center section of the tire may be in either a periodic or a non-periodic sequence of changing corrugated ridge and valley orientations.

The tangential force at which closure of the sipe occurs, causing the bending in the characteristic bending line, is conventionally determined by a relationship of a third power of the sipe depth to a first power of the sipe thickness. A favorable position of the bending point results in a sipe thickness between, e.g., approximately 0.3 mm and 1.0 mm, depending on the sipe density, depth and rubber hardness. It is advantageous that the thicknesses of these sipes are within the range of conventional art and that a transition to the invention process is hence facilitated.

Particularly for passenger car winter tires having an especially large number of sipes, in which sipe thicknesses between 0.5 and 0.6 mm are common, the optimal width of the sipes of the present invention are just below that range, e.g., approximately 0.4 mm.

In accordance with a particular feature of the present invention, the vehicle tire is mounted on a vehicle.

In accordance with further feature of the present invention, the axially inwardly extension of the corrugated ridges and corrugated valleys of the first set is directed toward an axial center of the tire and the axially outwardly extension of the corrugated ridges and corrugated valleys of the second set is directed away from the axial center of the tire.

In accordance with another feature of the present invention, the corrugated sipes are cut in the tread in the green state.

To produce tires in accordance with the present invention, the unvulcanized (unfinished) tire does not have to be changed. However, different vulcanization molds are required. In accordance with the present invention, metal sheets for the sipes have to be anchored in conventional vulcanization molds and have to provide corrugated ridges and valleys that are oriented at an angle with respect to a metal anchor edge. Instead of first punching and then bending the corrugation, the present invention, due to the angled positioning of the corrugated ridges and valleys and the different lengths of the individual corrugated ridges and valleys in the area of the edges associated therewith, first bends larger sheets of metal into the desired corrugated manner parallel to the edges of the sheet metal mold, and then separates out the individual sipe metal sheets, which are oriented at an angle to the edges of the sheet metal mold, e.g., by using a punching method.

Thus, the present invention is also directed to a tire mold for producing a vehicle tire having at least two axial end sections, a tread having corrugated sipes running substantially in an axial direction in at least one of the axial end sections when viewed perpendicular to the tread, the corrugated sipes including corrugated ridges and corrugated valleys having substantially straight lines diagonally inclined in an oblique plane parallel to a longitudinal extent of the sipes, the corrugated sipes including a first set of the corrugated sipes in which the corrugated ridges and corrugated valleys are arranged, in a radially outward direction, to extend axially inwardly, and the corrugated sipes including a second set of the corrugated sipes in which the corrugated ridges and corrugated valleys are arranged, in a radially outward direction, to extend axially outwardly. The tire mold includes a portion for forming at least one joint track that includes the corrugated sipes of the first and second sets of sipes.

In accordance with a further feature of the present invention, the tire mold includes at least one joint track including the corrugated sipes of the first and second set. The tire mold includes a metal plate having a longitudinal extent with a length substantially equal to a sipe length and a radial extent, and including a planar portion, and an undulating surface portion coupled to the planar portion having undulating ridges and undulating valleys for producing the corrugated sipes, one of the undulating ridges and undulating valleys being formed within a plane formed by the planar portion. The undulating ridges and the undulating valleys may form substantially straight lines forming an angle to the radial extent When the metal plate is mounted in a first position, the first set of sipes are formed, and when the metal plate is mounted in a second position, the second set of sipes are formed.

In accordance with another feature of the present invention, the first position and the second position may be 180° apart.

In accordance with another feature of the present invention, the metal plate may include a plurality of punched holes for mounting in the tire mold.

In accordance with still another feature of the present invention, the angle formed between the undulating ridges and valleys and the radial extent may be between approximately 20° and 70°. Further, the angle formed between the undulating ridges and valleys and the radial extent may be between approximately 30° and 50°.

In accordance with a further feature of the present invention, the metal plate may include a thickness of between approximately 0.3 mm and 1.0 mm.

In accordance with a still further feature of the present invention, the longitudinal extent may be positioned to form an angle of less than or equal to approximately 45° with an axial direction of the tire to be produced. Further, the longitudinal extent may be positioned to form an angle of between approximately 20° and 30° with an axial direction of the tire to be produced.

In accordance with yet another feature of the present invention, the metal plate may be produced by first bending the undulating portion in a sheet and then punching the metal sheet mold plate out of the bent sheet.

In accordance with yet another feature of the present invention, the corrugated sipes are cut in the green rubber of the tread.

Other exemplary embodiments and advantages of the present invention may be ascertained by reviewing the present disclosure and the accompanying drawing.

BRIEF DESCRIPTION OF THE DRAWINGS

The present invention may be farther described in the detailed description which follows, in reference to the noted drawing by way of non-limiting example of a preferred embodiment of the present invention, and wherein.

DETAILED DESCRIPTION OF THE PRESENT INVENTION

Figure 1:
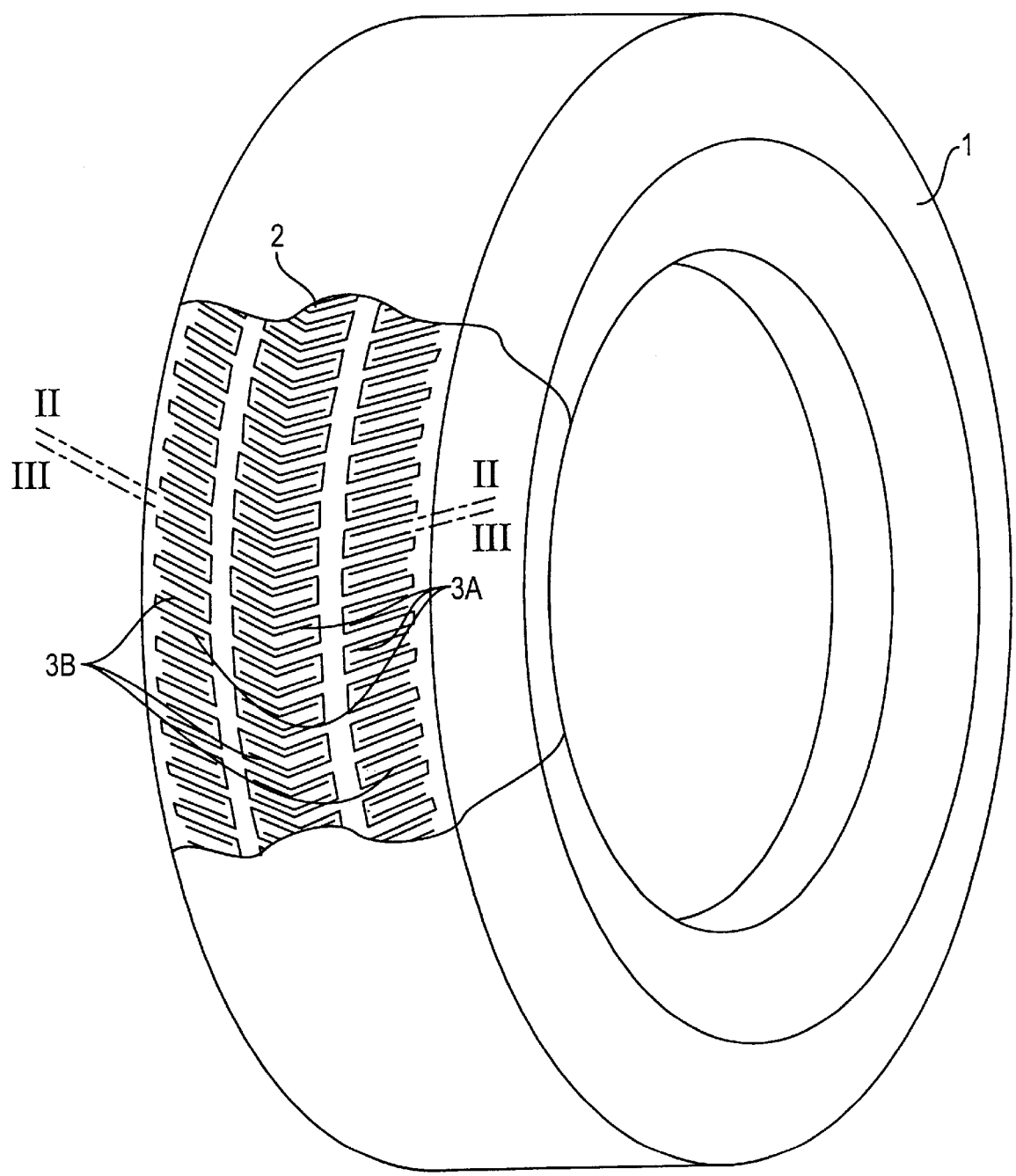
FIG. 1 illustrates a perspective view of a tire in accordance with the invention.

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawing figure making apparent to those skilled in the art how the invention may be embodied in practice.

FIG. 1 illustrates a perspective view of a tire 1 including a tread 2 having sipes 3a and 3b running substantially in an axial direction across their entire axial extent when viewed from the top, i.e., perpendicular to the tread 2. A thick dot-dashed, and substantially V-shaped line, forms a section line II—II along sipes 3a (shown in sectioned view as FIG. 2) and a similar thick dot-dashed, and substantially V-shaped line, forms a section line III—III along sipes 3b (shown in sectioned view as FIG. 3).

Figure 2:
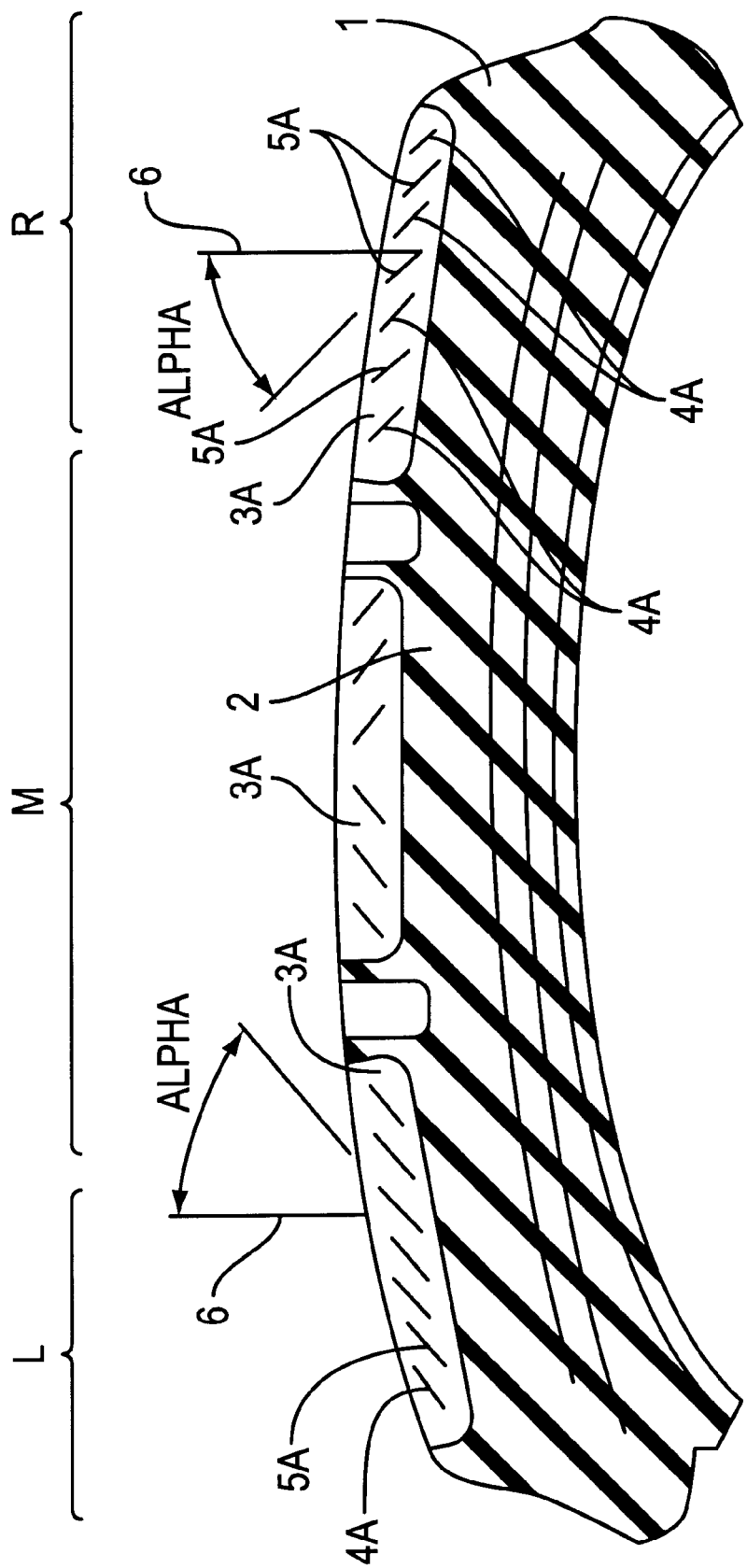
FIG. 2 illustrates an enlarged sectional view of the tire depicted in FIG. 1 taken along the plane II—II.

FIG. 2 illustrates an enlarged sectional view of tire 1 taken along an oblique plane parallel to a longitudinal extent of sipes 3a. A substantially flat surface of corrugated ridges 4a and corrugated valleys 5a are depicted as thin solid lines where the surface is rounded and not, in accordance with conventional illustrations, stretched to the adjoining terminal end of the body illustrated with a thick solid line. An angle of inclination, e.g., a (alpha), for the substantially flat surfaces of corrugated ridges and valleys 4a and 5a may be, e.g., approximately 45°.

The angled positioning of corrugated ridges 4a and corrugated valleys 5a may be arranged such that the substantially flat surfaces, in a radially outward direction, extend axially inwardly, i.e., toward a axial center of tire 1. In a symmetrical tire, an orientation change would occur in a center section M of the tire.

Although, as shown in FIG. 2, the angled positioning of corrugated ridges 4a and corrugated valleys 5a is provided across an entire width of tread 2, as far as sipes are concerned, the oblique positioning is particularly important in the two edge sections L and R of the tread 2.

Figure 3:
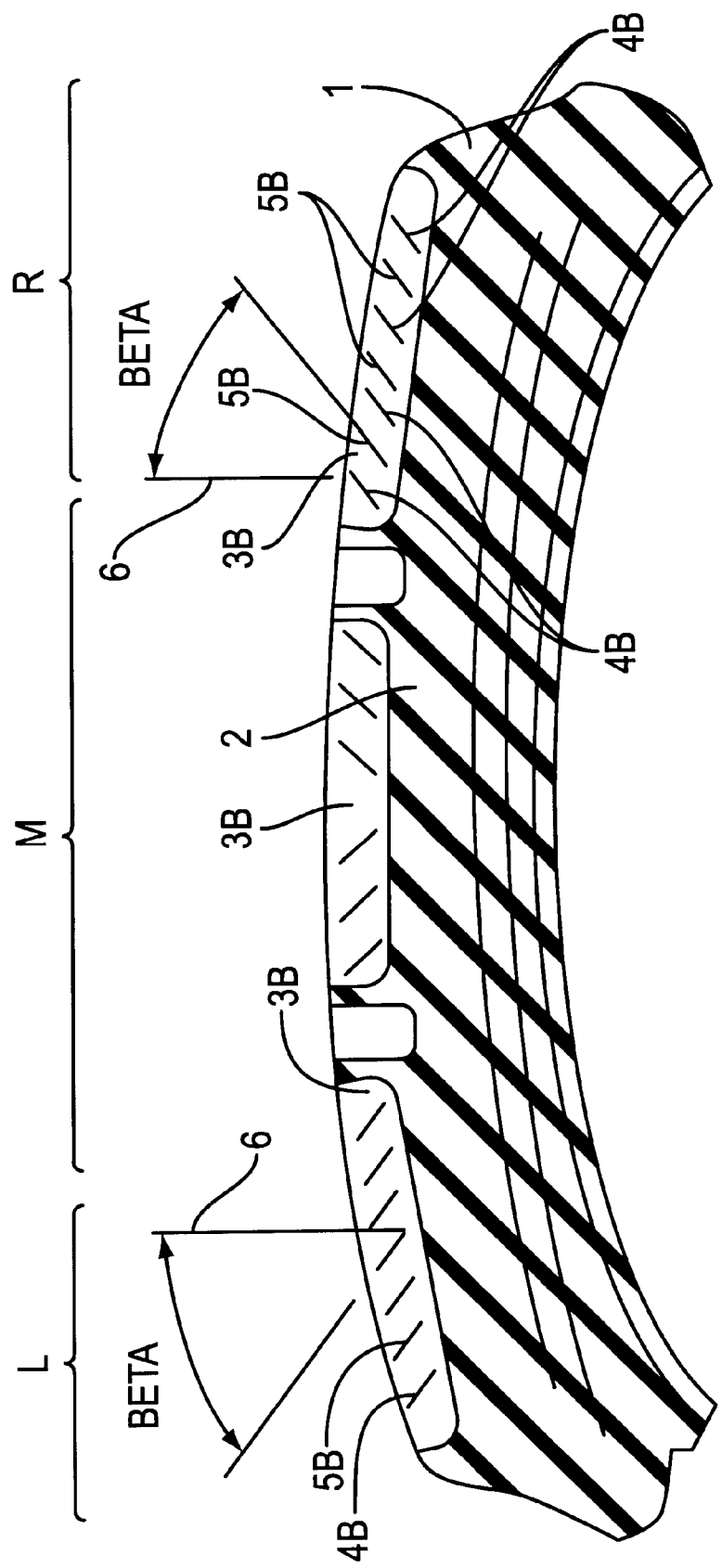
FIG. 3 illustrates an enlarged sectional view of the tire depicted in FIG. 1 taken along the plane III—III.

FIG. 3 illustrates an enlarged sectional view of tire 1 taken along an oblique plane parallel to a longitudinal extent of sipes 3b. Corrugated ridges 4b and corrugated valleys 5b in this figure are angled in the other direction with respect to the radial direction displayed in FIG. 2. That is, the oblique positioning of the substantially flat surfaces of corrugated ridges 4b and corrugated valleys 5b, in the radially outward direction, extend axially outwardly, i.e., away from the axial center of the tire and toward the nearest tire edge. As with the arrangement shown in FIG. 2, in a symmetrical tire, the orientation change would be located in center section M.

Although, as shown in FIG. 3, the angled positioning of corrugated ridges 4b and corrugated valleys 5b is provided across an entire width of tread 2, as far as sipes are concerned, the oblique positioning is particularly important in the two edge sections L and R of the tread 2.

Tire 1, and more particularly, tread 2, may include at least one joint track that includes corrugated ridges 4a and 4b and corrugated valleys 5a and 5b. In other words, within at least one joint track, corrugated ridges and valleys are provided that extend axially inwardly and corrugated ridges and valleys are provided that extend axially outwardly. The sipes may be formed by cutting the tread in the green state.

Figure 5:
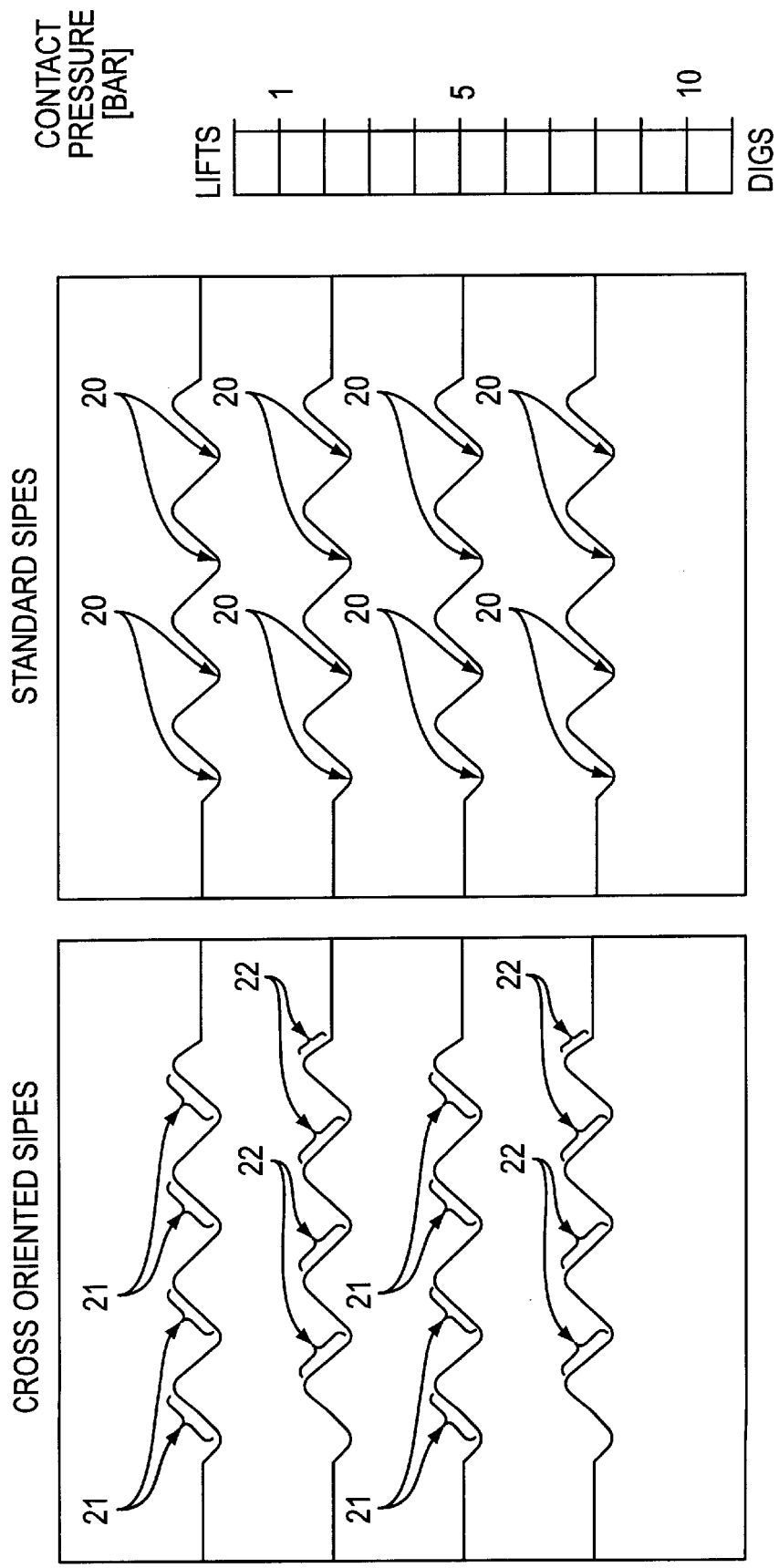
FIG. 5 compares pressing distribution of the sipes of the present invention with the sipes of a conventional tire.

As illustrated in FIG. 5, the alternating orientation of the ridges and valleys of the sipes of the present invention provides a more evenly distributed horizontal pressure of the of the sipe flanks against the snow, especially the snow impressed in the sipes. Thus, the alternating orientation of the ridges and valleys of the sipes provides better force transmission in the horizontal plane, significantly improving traction and braking on snow and generally improving traction and braking on icy and/or wet roads. This nearly uniform pressure is evidenced by the contact pressure legend.

While conventionally corrugated sipes concentrate the horizontal pressure against snow and the like in their valleys 20, sipes corrugated in accordance with the present invention, i.e., with an alternating orientation of ridges and valleys, provide a substantially uniform pressure over an entire flank 21 or 22. As shown in the right-hand subfigure utilizing sipes produced in the conventional manner, the pressure concentration is produced in the peak 20 of valleys, while the left-hand subfigure illustrates the present invention in which substantially uniform pressure is alternatingly produced along either flanks 21 or flanks 22, which extend from valley to ridge.

In particular, considering the sipes from top to bottom in the left-hand subfigure, the first sipe shows a substantially uniform pressure produced along each flank 21, while the second sipe shows a substantially uniform pressure produced along each flank 22, opposite flank 21. The alternating substantially uniform pressure along flanks 21 or 22 continues for each oppositely oriented ridge or valley.

Figure 4:
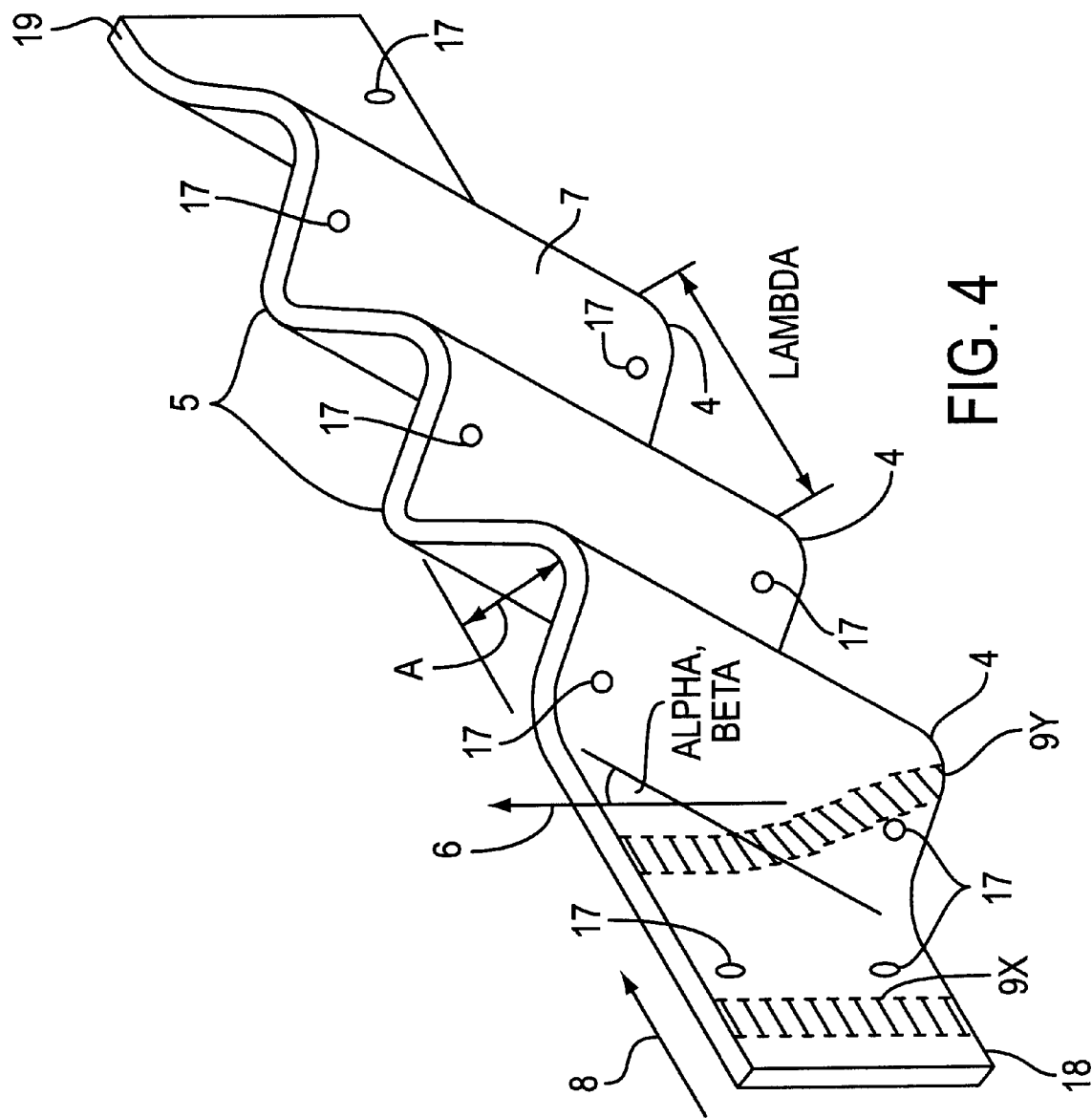
FIG. 4 illustrates a metal sheet in accordance with the invention to be anchored in the vulcanization mold for manufacturing the sipes in accordance with the invention.

FIG. 4 illustrates a perspective view of one of a plurality of sheets of metal (a siping element) 7 that may be anchored in a vulcanization mold and include an undulating portion for manufacturing sipes 3a and/or 3b. By flipping metal sheet 7, i.e., by rotating it 180° around a radial center axis or around the center axis of the metal sheet (positioned parallel to a main extension direction), metal sheets 7 can be utilized for manufacturing both sipe types 3a and 3b, if the sipes are to be provided with a same angle to radial axis 6.

Punched holes 17 may be provided as conventional mounting elements to anchor sheet metal pieces 7, e.g., aluminum segments, in the vulcanization mold. Punched holes 17 may be provided in a vicinity of a metal sheet edge 18 and metal sheet edge 19 to make rotation around an axis possible. If rotation of metal sheets 7 is to occur around an axis, it is sufficient if punched holes 17 are only located on one of the two metal sheet edges 18 or 19 serving to anchor metal sheet 7 in the segments of the vulcanization mold.

Front and back ends of metal sheet 7 depicted in FIGS. 2 and 3 are shown as radially aligned. However, these ends preferably run at a slight angle to the radial axis for the bending sipes. Corrugated ridges 4a and/or 4b and corrugated valleys 5a and/or 5b are provided as substantially straight lines, but inclined at an angle, e.g., α (alpha) or β (beta). However, it is necessary, in accordance with the present invention, that the orientation change, to varying degrees, of the inclination occur in at least some sections located in a successive track.

To further explain the present invention, respective cutting planes 9x and 9y of two different planes perpendicular to main extension direction 8 of metal sheet 7 are illustrated as a shaded section. Main extension direction 8 of metal sheet 7 is generally to be oriented within a range of, e.g., approximately ±45° with respect to axial direction, and preferably within a range of, e.g., approximately 20° to 30°. The corrugation length, e.g., from ridge-to-ridge, in the axial direction may be referred to as, λ (lambda), which may be within the range of the prior art. The corrugation height A, e.g., from ridge-to-ridge perpendicular to the axial direction, may also be with the range of the prior art.

In preparing the mold for producing the tire in accordance with the present invention, at least two metal sheets 7 may be positioned in a portion for forming at least one joint track of the tread such that, in a first position, the axially inwardly extending corrugated ridges and valleys will be formed and, in a second position (180° from the first position), the axially outwardly extending corrugated ridges and valleys will be formed. In this manner, the tread will be produced that has at least one joint track including corrugated ridges and valleys extending in each of the axially inwardly and the axially outwardly direction. The sipes may be formed by cutting the green rubber of the tread.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A vehicle tire comprising:
   a tread including at least two axial end sections and corrugated sipes running substantially in an axial direction in at least one of the axial end sections when viewed perpendicular to the tread;
   the corrugated sipes comprising ridges and valleys defining substantially straight lines diagonally inclined in an oblique plane parallel to a longitudinal extent of the sipes;
   the corrugated sipes comprising a first set of sipes and a separate second set of sipes;
   each of the ridges and valleys of the corrugated sipes of the first set of sipes being arranged, in a radially outward direction, to extend axially inwardly;
   each of the ridges and valleys of the corrugated sipes of the second set of sipes being arranged, in a radially outward direction, to extend axially outwardly; and
   at least one joint track including the corrugated sipes of the first and second sets of sipes.

2. The vehicle tire in accordance with claim 1, wherein, in a track, at least one of:
   (a) each sipe of the first set is immediately followed by a sipe of the second set; and
   (b) each sipe of the second set is immediately followed by a sipe of the first set.

3. The vehicle tire in accordance with claim 1, wherein a corrugated sipe of one of the first and second set is immediately followed in a track by one or more corrugated sipes of the one of the first and second set.

4. The vehicle tire in accordance with claim 1, further comprising:

an arrangement of a sequence of the corrugated sipes in a track is periodic.

5. The vehicle tire in accordance with claim 1, the ridges and the valleys of the first and second set in the oblique plane form an angle, with respect to the radial direction, between approximately 20° and 70°.

6. The vehicle tire in accordance with claim 1, the ridges and the valleys of the first and second set in the oblique plane form an angle, with respect to the radial direction, between approximately 30° and 50°.

7. The vehicle tire in accordance with claim 1, the corrugated sipes comprising a sipe width between approximately 0.3 mm and 1.0 mm.

8. The vehicle tire in accordance with claim 1, further comprising:

an axial center section of the tread, positioned between the axial end sections of the tread, including a plurality of center corrugated sipes running substantially in the axial direction;

the center corrugated sipes having ridges and valleys defining substantially straight lines diagonally inclined in the oblique plane;

the center corrugated sipes comprising a first set of center sipes and a second set of center sipes;

each of the ridges and valleys of the center corrugated sipes of the first set of center sipes being arranged, in a radially outward direction, to extend axially inwardly; and each of the ridges and valleys of the center corrugated sipes of the second set of center sipes being arranged, in a radially outward direction, to extend axially outwardly.

9. The vehicle tire in accordance with claim 1, wherein the first and second sets of sipes are alternatingly arranged in a circumferential direction in the at least one joint track.

10. The vehicle tire in accordance with claim 1, wherein a corrugated sipe of one of the first and second set is immediately followed in a track by one or more corrugated sipes of the one of the first and second set, and the tire further comprises:

an axial center section of the tread, positioned between the axial end sections of the tread, including a plurality of center corrugated sipes running substantially in the axial direction;

the center corrugated sipes having ridges and valleys defining substantially straight lines diagonally inclined in the oblique plane;

the center corrugated sipes comprising a first set of center sipes and a second set of center sipes;

each of the ridges and valleys of the center corrugated sipes of the first set of center sipes being arranged, in a radially outward direction, to extend axially inwardly; and each of the ridges and valleys of the center corrugated sipes of the second set of center sipes being arranged, in a radially outward direction, to extend axially outwardly.

11. A tire mold for producing a vehicle tire, the vehicle tire including a tread having at least two axial end sections and corrugated sipes running substantially in an axial direction in at least one of the axial end sections when viewed perpendicular to the tread, the corrugated sipes including ridges and valleys defining substantially straight lines diagonally inclined in an oblique plane parallel to a longitudinal extent of the sipes, the corrugated sipes including a first set of sipes in which each of the ridges and valleys of the first set are arranged, in a radially outward direction, to extend axially inwardly, and the corrugated sipes including a separate second set of sipes in which each of the ridges and valleys are arranged, in a radially outward direction, to extend axially outwardly, the tire mold comprising:

an outer mold portion; and a portion for forming at least one joint track that includes the corrugated sipes of the first and second sets of sipes.

12. The tire mold in accordance with claim 11, wherein the portion for forming at least one joint track comprises:

a plurality of metal plates, the metal plates having a longitudinal extent with a length substantially equal to the sipe length and a radial extent, and including a planar portion;

an undulating surface portion coupled to the planar portion having undulating ridges and undulating valleys for producing the corrugated sipes, one of the undulating ridges and undulating valleys being formed within a plane formed by the planar portion;

the undulating ridges and the undulating valleys defining substantially straight lines oriented at an angle to the radial extent, wherein some of the plurality of metal plates are mounted in a first position for forming the first set of sipes, and wherein other of the plurality of metal plates are mounted in a second position, which is oriented inversely to the first position, for forming the second set of sipes.

13. The tire mold in accordance with claim 12, wherein the first position and the second position being 180° apart.

14. The tire mold in accordance with claim 12, the metal plate further comprising a plurality of punched holes for mounting in the tire mold.

15. The tire mold in accordance with claim 12, the angle formed between the undulating ridges and valleys and the radial extent is between approximately 20° and 70°.

16. The tire mold in accordance with claim 12, the angle formed between the undulating ridges and valleys and the radial extent is between approximately 30° and 50°.

17. The tire mold in accordance with claim 12, the metal plate further comprising a thickness of between approximately 0.3 mm and 1.0 mm.

18. The tire mold in accordance with claim 12, wherein the longitudinal extent is positioned to form an angle of less than or equal to approximately 45° with an axial direction of the tire to be produced.

19. The tire mold in accordance with claim 12, wherein the longitudinal extent is positioned to form an angle of between approximately 20° and 30° with an axial direction of the tire to be produced.

20. The tire mold in accordance with claim 11, wherein the portion forming at least one joint track comprises:

a first set of metal plates adapted for cutting the first set of sipes;

a second set of metal plates adapted for cutting the second set of sipes, wherein the first and second metal plates are mounted to the outer mold portion.

21. The tire mold in accordance with claim 11, wherein the first and second sets of sipes to be formed in the at least one joint track are alternatingly arranged in circumferential direction.

22. A vehicle having a tire coupled thereto, the tire comprising:

a tread including at least two end sections and corrugated sipes running substantially in an axial direction in at least one of the axial end sections when viewed perpendicular to the tread;

the corrugated sipes comprising ridges and valleys defining substantially straight lines diagonally inclined in an oblique plane parallel to a longitudinal extent of the sipes;

the corrugated sipes comprising a first set of sipes and a separate second set of sipes;

each of the ridges and valleys of the corrugated sipes of the first set of sipes being arranged, in a radially outward direction, to extend axially inwardly;

each of the ridges and valleys of the corrugated sipes of the second set of sipes being arranged, in a radially outward direction, to extend axially outwardly; and at least one joint track including the corrugated sipes of the first and second sets of sipes.

23. The vehicle in accordance with claim 22, wherein a corrugated sipe of one of the first and second set is immediately followed in a track by one or more corrugated sipes of the one of the first and second set, and the tire further comprises:

an axial center section of the tread, positioned between the axial end sections of the tread, including a plurality of center corrugated sipes running substantially in the axial direction;

the center corrugated sipes having ridges and valleys defining substantially straight lines diagonally inclined in the oblique plane;

the center corrugated sipes comprising a first set of center sipes and a second set of center sipes;

each of the ridges and valleys of the center corrugated sipes of the first set of center sipes being arranged, in a radially outward direction, to extend axially inwardly; and each of the ridges and valleys of the center corrugated sipes of the second set of center sipes being arranged, in a radially outward direction, to extend axially outwardly.

* * * * *